Jan. 31, 1961

J. A. KAUFFMANN 2,970,297

MAGNETIC BRANCHING CIRCUIT

Filed Dec. 23, 1957

2 Sheets-Sheet 1

INVENTOR.
JOHN A. KAUFFMANN
BY
William V Schelberg
AGENT

Jan. 31, 1961 J. A. KAUFFMANN 2,970,297

MAGNETIC BRANCHING CIRCUIT

Filed Dec. 23, 1957 2 Sheets-Sheet 2

United States Patent Office 2,970,297

Patented Jan. 31, 1961

2,970,297

MAGNETIC BRANCHING CIRCUIT

John A. Kauffmann, Hyde Park, N.Y., assignor to International Business Machines Corporation, New York, N.Y., a corporation of New York Filed Dec. 23, 1957, Ser. No. 704,462

8 Claims. (Cl. 340—174)

This invention relates to pulse transfer and switching circuits and more particularly to a magnetic core branching circuit which does not require the use of diodes.

A basic transfer circuit which avoids the use of diodes to provide an all magnetic delay line is described and claimed in a copending application Serial No. 528,594 filed August 16, 1955, now Patent No. 2,907,987, in behalf of Louis A. Russell, which is assigned to the assignee of this application. In this copending application a ferrite coupling core and a resistor replace the diodes in conventional transfer circuitry. The speed of operation of this circuit is directly dependent upon the current requirements of the output component. Providing a plurality of outputs either serially or in parallel, increases the current requirements and decreases the optimum speed of operation accordingly.

This also necessitates changing the magnitudes of the resistors utilized. A branching circuit in which a plurality of outputs is provided and wherein the operating speed remains compatible with that of existing diodeless type circuitry is useful in logical systems arrangements.

In accordance with this invention an output branching circuit is provided wherein two diodeless transfer devices of the type disclosed in the aforementioned copending application, are appropriately coupled, with a double inverter device coupled intermediate the first and second transfer device. In this respect, an inverter device may be defined as having a single input terminal and a single output terminal at which a signal is obtained whenever there is an absence of a signal into the input terminal. The double inverter function is achieved by constructing a device, as shown in the preferred embodiment, comprising an input coupling core, an output coupling core, an inhibit and a storage core. At times when information may be transferred into the circuit, the inhibit core is pulsed to a set condition to provide an induced voltage which normally switches the storage core to the set condition. However, if information is transferred into the device, the input information cancels the effect produced by setting the inhibit core, thereby preventing the storage core from being set at this time. Subsequently, the storage core is pulsed to the set condition, and depending upon the state of the core at this time, an output signal is induced which is transferred through the output coupling core to further logical circuitry at the same time that an output signal is transferred through a further output coupling core to other logical circuitry.

Accordingly, it is an object of this invention to provide an improved magnetic core branching circuit wherein the current requirements of output coupling components are not increased.

It is a more general object of this invention to provide a one-input, two-output magnetic core branching circuit.

A further object of this invention is to provide a diodeless magnetic core branching circuit.

Still another and more specific object of this invention is to provide a branching circuit which is adapted to receive input pulses over a selectable time interval and to produce a plurality of output indications at a selectable time interval.

Other objects of the invention will be pointed out in the following description and claims and illustrated in the accompanying drawings, which disclose, by way of example, the principle of the invention and the best mode, which has been contemplated, of applying that principle.

Figure 1:
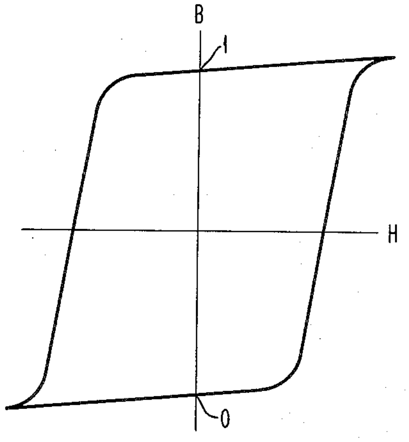
Fig. 1 is a perspective of the hysteresis characteristic obtained for a magnetic material of the type employed.

Referring to Fig. 1, the curve illustrates a plot of flux density (B) versus applied field (H) for a magnetic core having a substantially rectangular hysteresis characteristic. The opposite remanence states are conventionally employed for representing binary information conditions and are arbitrarily designated as "0" and "1." With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in the reverse sense to the same or another winding. Such a pulse is hereinafter referred to as a "read" pulse. Should a "1" have been stored, a large flux change occurs with the shift from "1" to "0" conditions with a corresponding voltage magnitude developed on an output winding. On the other hand, should a "0" have been stored, little flux change occurs and negligible signal is developed on the output winding.

A dot is shown adjacent one terminal of each of the windings indicating its winding direction. A write pulse is a positive pulse which is directed into the undotted end of the winding terminal which tends to store a "1," while a read pulse is a positive pulse directed into the dotted end of the terminal and tends to apply a negative magnetomotive force, or store a "0."

The arrangement disclosed employs input and output coupling magnetic cores and an inhibit core arranged intermediate to so called storage magnetic cores which store certain logical information. These arrangements are adapted to be interconnected with each other and with similar type circuitry through such coupling cores. The use of the so called inhibit core in the circuit will be further explained in the detailed description to follow. A more comprehensive description of the function and use of the inhibit core may be found in a copending application Serial Number 689,827, filed October 14, 1957, on behalf of John A. Kauffmann which is assigned to the assignee of this application.

The coupling cores and inhibit core may be fabricated of ferrite materials like the storage or memory cores, however, it is not essential that these cores exhibit the rectangular hysteresis characteristic required of the storage cores as these devices function as variable impedance elements in controlling the transfer of information pulses as will be more evident from the following description. Such interconnecting coupling cores and inhibit core are illustrated in the circuit and are labeled $C_1$, $C_2$, $C_3$, $C_4$ and I for clarity. Also shown are three storage cores $S_1$, $S_2$, and $S_3$ which are adapted to store information received. The core $S_1$ is adapted to deliver information received to another storage core $S_2$ via the coupling core $C_2$. The storage cores $S_2$ and $S_3$ are adapted to receive information and deliver it to a further logical stage.

Figure 2:
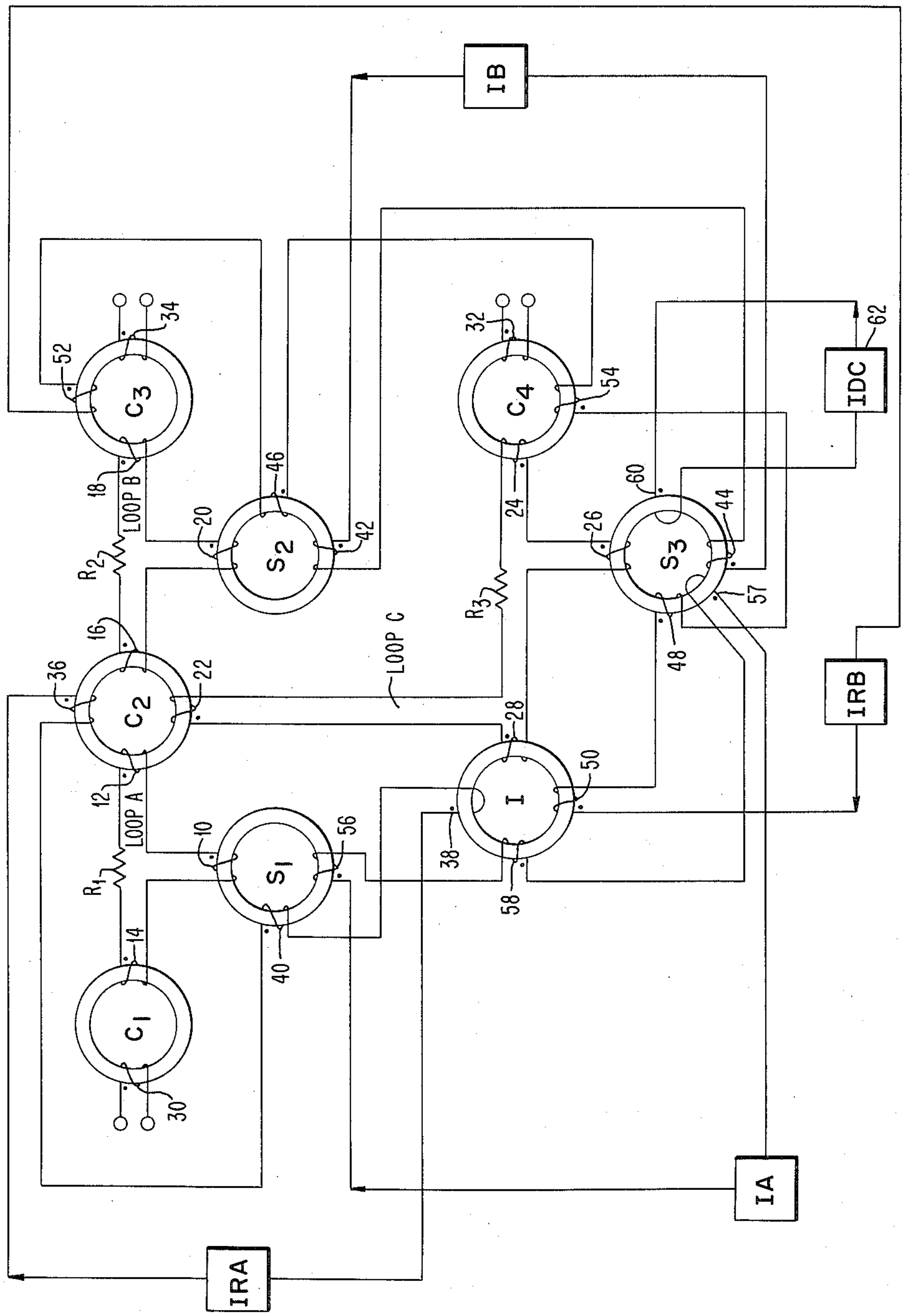
Fig. 2 is a circuit diagram of a magnetic core branching circuit.

Referring now to Fig. 2, the core $S_1$ is provided with a winding 10 interconnected with an input winding 12 on the core $C_2$ and an output winding 14 on the core $C_1$ through a resistor $R_1$, which interconnection will hereinafter be referred to as loop A. The core $C_2$ is further provided with a winding 16 which is interconnected with a winding 18 on the core $C_3$ through a resistor $R_2$ and a winding 20 on the core $S_2$, which interconnection will hereinafter be referred to as loop B. The core $C_2$ is further provided with a winding 22 interconnected with a winding 24 on the core $C_4$ through a resistor $R_3$, a winding 26 on the core $S_3$ and a winding 28 on the core I, which interconnection will hereinafter be referred to as loop C. Inputs are applied to the core $C_1$ by means of an input winding 30, while outputs are obtained from the branch by means of an output winding 32 on the core $C_4$ and an output winding 34 on the core $C_3$. The coupling core $C_2$, the inhibit core I and the storage core $S_1$ are energized from a clock pulse source $I_{RA}$ while the storage cores $S_2$ and $S_3$ and the inhibit core I are energized by a clock pulse source $I_{RB}$, while the storage cores $S_1$ and $S_3$ with the inhibit core I are energized by a clock pulse source $I_A$. A winding 36 is provided on the core $C_2$, a winding 38 on the core I and a winding 40 on the core $S_1$ which windings are connected with the source $I_{RA}$. Similarly, a winding 42 is provided on the core $S_2$ and a winding 44 on the core $S_3$ which are connected with the source $I_B$. A winding 46 is provided on the core $S_2$, a winding 48 on the core $S_3$, a winding 50 on the core I, a winding 52 on the core $C_3$ and a winding 54 on the core $C_4$ which windings are connected with the source $I_{RB}$, while similarly a winding 56 is provided on the core $S_1$, a winding 57 on the core $S_3$ and a winding 58 on the core I which windings are connected with the source $I_A$. A bias winding 60 is provided on the core $S_3$ connected with a direct current bias source 62 which is adapted to bias the core $S_3$ in the lower remanence or "0" state.

Figure 3:
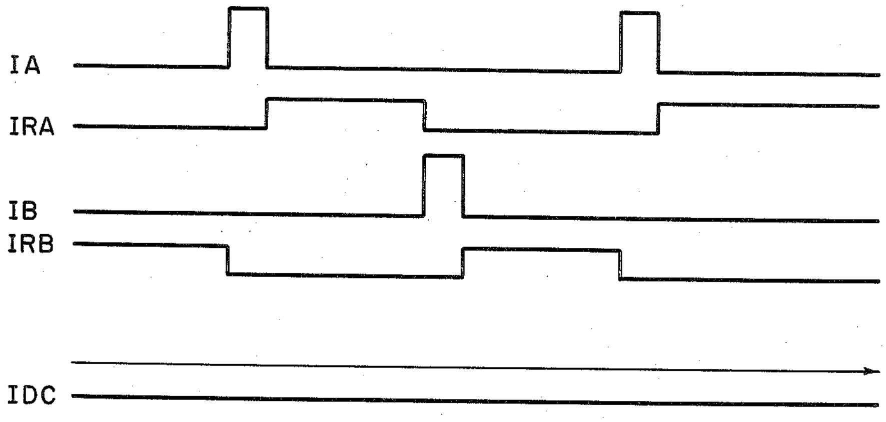
Fig. 3 illustrates the relative timing of current pulses which are required for operation of the circuit shown in Fig. 2.

The sequence of pulses provided by the several clock pulse sources described above is as indicated in the Fig. 3, which sources are adapted to operate with the circuit as shown in Fig. 2.

Referring to Fig. 2, assume all cores are in the lower remanence condition or "0" residual state except the core $S_1$ which is in the "1" state as shown in the Fig. 1. Initially, the $I_A$ clock pulse source directs a signal into the windings 57 and 58 which tends to write the cores $S_3$ and I, respectively, and into the winding 46 which tends to read the core $S_1$. The core $S_1$ switches from the "1" toward the "0" state, while the core I switches from the "0" toward the "1" state and the core $S_3$ is biased toward the write threshold. The core $S_1$ in switching induces a voltage in the winding 10 with the dotted end positive causing a counter-clockwise current in the loop A which writes the core $C_2$. The core $C_2$ in switching from the "0" toward the "1" state induces a voltage in the windings 16 and 22 with the undotted end positive causing a counter-clockwise current in loop B and tending to cause a clockwise current in loop C. The current in loop B tends to write the core $S_2$ and $C_3$, but due to the greater number of turns on the core $S_2$ in comparison with that on the core $C_3$, only the core $S_2$ is fully switched toward the "1" state. Coincidentally, the core I in switching from the "0" toward the "1" state induces a voltage in the winding 28 with the undotted end positive. The voltages induced in the winding 22 and the winding 28 on the cores $C_2$ and I, respectively, effectively cancel and negligible current is realized in the loop C. At the termination of the $I_A$ clock pulse, the cores $C_2$, I and $S_2$ are left in the "1" remanence state while the core $S_1$ is left in the "0" remanence state. The $I_{RA}$ clock pulse directs a read signal into the windings 36 and 40 on the cores $C_2$ and $S_1$ and a write signal into the winding 38 on the core I. The core $C_2$ is then switched from the "1" toward the "0" state which induces a voltage in the windings 12, 16 and 22 with the dotted end positive causing a clockwise current in the loop B and a counter-clockwise current in the loop A and the loop C. The clockwise current in the loop B tends to read the core $C_3$ and the core $S_2$. The counter-clockwise current in the loop As is in such a direction as to read the core $C_1$ and write the core $S_1$. Since the core $C_1$ is already in the "0" remance state and the core $S_1$ is held in the "0" state by virtue of the drive in the winding 40, no change in magnetic state takes place, with the energy dissipated in the resistor $R_1$. The counter-clockwise current in the loop C is such as to read the core I and $C_4$ and write the core $S_3$. The switching of the core $C_2$ by the $I_{RA}$ clock pulse source is done slowly so the above loop currents do not exceed threshold for the cores $S_2$, I and $S_3$. To insure the cores I and $S_3$ remain in the "1" and "0" states respectively, the core I is biased by virtue of the drive in the winding 38, while the D.C. bias 62 applied to the winding 60 on the core $S_3$ performs this function. Thus, at the termination of the $I_{RA}$ clock pulse, the core $C_2$ is left in the "0" remanence state, while the cores $S_2$ and I are left in the "1" remanence state. The $I_B$ clock pulse source now directs a signal into the winding 42 on the core $S_2$ and a write signal into the winding 44 on the core $S_3$. Consequently, the core $S_2$ is switched from the "1" toward the "0" state, while the core $S_3$ is switched from the "0" toward the "1" state. The core $S_2$ in switching induces a voltage in the winding 20 which causes a counter-clockwise current in the loop B tending to write the core $C_3$ and read the core $C_2$. Since the $C_2$ is already in the "0" state, the core $C_3$ switches from the "0" toward the "1" state and in so doing induces a voltage in the output winding 34 with the undotted end positive. The core $S_3$ in switching from the "0" toward the "1" state induces a voltage in the winding 26, causing a clockwise current in the loop C which tends to write the core I, read the core $C_2$ and write the core $C_4$. Since the core I is already in the "1" state and the core $C_2$ is in the "0" state, the core $C_4$ is switched from the "0" toward the "1" state to induce a voltage in the output winding 32 with the undotted end positive. Subsequently, the $I_{RB}$ clock pulse source directs a read signal into the windings 52, 54, 42, 48 and 50 on the cores $C_3$, $C_4$, $S_2$, $S_3$ and I, respectively, which pulse switches the cores $C_3$, $C_4$ and I from the "1" state toward the "0" state. The core $C_3$ in switching induces a voltage in the winding 18 which causes a counter-clockwise current in loop B tending to read the core $C_2$ and write the core $S_2$. The cores $C_4$, $S_3$ and I while switching, induce a voltage in the windings 24, 26 and 28, respectively, the algebraic sum of which causes a clockwise current in the loop C tending to read the core $C_2$. Since the core $C_2$ is already in the "0" state, neither of the loop currents effect its stable state other than to drive it further into saturation and the core $S_2$ is uneffected by virtue of the $I_{RB}$ drive in its winding 46 at this time. Thus, at the termination of the $I_{RB}$ clock pulse, all cores are left in their "0" remanent condition readying the circuit for the next cycle of operation.

Assuming in the second cycle of operation, no information has been previously transferred into the core $S_1$. Operation of the $I_A$ clock pulse source directs a read signal into the winding 56 on the core $S_1$ and a write signal into the windings 57 and 58 on the cores $S_3$ and I, respectively. Since the core $S_1$ is already in the "0" state, negligible flux change occurs in the core other than to drive it further into saturation. The core I is switched from the "0" toward the "1" state to induce a voltage in the winding 28 with the undotted end positive causing a counterclockwise current in the loop C which tends to write the cores $S_3$ and $C_2$ and read the core $C_4$. Since the core $C_4$ is already in the "0" state, it is uneffected. The core $C_2$ would normally switch preferentially toward the "1" state, due to the larger number of turns in the winding 22 as compared with the winding 26 on the core $S_3$, however, the biasing, to write threshold, applied to the winding 57 on the core $S_3$, allows the core $S_3$ to switch preferentially from the "0" to the "1" state at this time. At the termination of $I_A$ clock pulse, the cores I and $S_3$ are left in the "1" remanence state while the remaining cores are left in the "0" remanence state. The $I_{RA}$ clock pulse source directs a read signal into the winding 36 on the core $C_2$ and write signal into the winding 38 on the core I and a read signal into the winding 40 on the core $S_1$. The number of turns in the winding 38 on the core I is small so as to allow only biasing of the core toward the "1" state rather than a full switching pulse. The cores $C_2$ and $S_1$ are already in the "0" state so negligible flux change takes place in either of the cores. The $I_B$ clock pulse source now directs a read signal into the winding 42 on the core $S_2$ and a write signal into the winding 44, on the core $S_3$. Since the core $S_2$ already is in the "0" state and the core $S_3$ is already in the "1" state, negligible flux change occurs in either of the cores. Subsequently, the $I_{RB}$ clock pulse source directs a read signal into the windings 52, 54, 46, 48, and 50 on the cores $C_3$, $C_4$, $S_2$, $S_3$ and I, respectively, which switches the cores $S_3$ and I from the "1" toward the "0" state inducing a voltage in the windings 26 and 28 with their dotted ends positive. The algebraic sum of the induced voltage is effectively zero to allow negligible current in the loop C. Thus, upon termination of the $I_{RB}$ clock pulse all cores again are left in the "0" remanence state readying the circuit for the next cycle operation.

It may be pointed out that the storage, inhibit and coupling cores may be of square loop type magnetic material and in such instances a bias current may be provided to a further winding inductively associated with each of them individually, except the core $S_3$, which biases the cores toward their positive threshold (write "1" direction) in speeding up the operation of the systems.

In the interest of providing a complete disclosure, details of one embodiment of the branching device wherein ferrite cores are employed is given below, however, it is to be understood that other component values and current magnitudes may be employed with satisfactory operation attained so that the values given should not be considered limiting.

With the clock pulse currents $I_A$ and $I_B$ delivering a constant current of 1.0 ampere, the windings 42, 44, and 56 may comprise ten turns, the winding 58 may comprise four turns, and the winding 57 may comprise one turn. With the clock pulse current $I_{RA}$ delivering a constant current of 0.6 ampere and the clock pulse current delivering a constant current of 0.4 ampere, the windings, 36, 40, 46, 48, 50, 52 and 45 may comprise one turn. In this particular embodiment, the D.C. bias 62 may provide a constant current of 0.5 ampere and the winding 60 may comprise one turn. In the coupling circuits interconnecting the storage and coupling cores, the windings 14, 16, 22, and 28 may comprise twelve turns, the windings 10, 20 and 26 may comprise ten turns, the windings 12, 18 and 24 may comprise five turns, while the windings 32 and 34 may comprise twelve turns and the winding 30 may comprise five turns, with the resistors $R_1$, $R_2$ and $R_3$ of 6 ohms.

In this particular embodiment a bias current of 0.5 ampere may be applied to a one turn winding on each core wherein each of the storage, inhibit and coupling cores may comprise toroids of manganese-magnesium ferrite composition having an outside diameter of 0.100 inch, inside diameter of 0.070 inch and thickness of 0.120 inch. The thickness may be obtained by stacking four cores, each of 0.030 inch thickness and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. In a binary information handling system, a branching circuit comprising a first and a second magnetic storage core; control winding means on each of said cores; an input coupling core; a first and a second output coupling core; input and output winding means on each of said coupling cores; an inhibit core; output winding means on said inhibit core; circuit means including a first resistor series connecting one winding of said output winding means on said input coupling core with the control winding means on said first storage core and the input winding means on said first output coupling core; further circuit means including a second resistor series connecting a further winding of said output winding means on said input coupling core with the output winding means on said inhibit core with the control winding means on said second storage core and the input winding means on said second output coupling core; a first, a second, a third, and a fourth clock pulse source adapted to deliver a sequence of pulses displaced in time; winding means on said input coupling core and said inhibit core connected with said first clock pulse source so as to cause said input coupling core to shift to a datum residual state and cause said inhibit core to be biased toward an opposite residual state when energized; winding means on said first and second storage core connected with said second clock pulse source so as to cause said first storage core to shift to the datum residual state and to cause said second storage core to shift to the opposite residual state when energized; winding means on said inhibit core and said first and second storage core and said first and second output coupling core connected with said third clock pulse source so as to cause said inhibit core and each of said storage cores and each of said output coupling cores to shift to the datum state when energized; winding means on said inhibit core and said second storage core connected with said fourth clock pulse source so as to cause said inhibit core to switch to the opposite state and to cause said storage core to be biased toward the opposite state when energized; and means for biasing said second storage core toward the datum residual state at all times.

2. A magnetic core branching circuit comprising a first and a second magnetic storage core each capable of assuming alternate stable residual magnetic states in representing binary information and having a switching threshold; control winding means on each of said cores; an input coupling core; a first and a second output coupling core; input and output winding means on each said coupling cores; an inhibit core; output winding means on said inhibit core; circuit means connecting one winding of said output winding means on said input coupling core with said control winding means on said first storage core and the input winding means on said first output coupling core; further circuit means connecting a further winding of said output winding means on said input coupling core with the output winding means on said inhibit core with the control winding means on said second storage core and the input winding means on said second output coupling core; shift winding means on said input coupling core and bias winding means on said inhibit core adapted to be energized simultaneously and drive said input coupling core toward a datum residual state and cause said inhibit core to be biased toward an opposite residual state; shift winding means on said first and second storage cores adapted to be energized simultaneously and to drive said first storage core toward the datum residual state and to drive said second storage core toward the opposite residual state; shift winding means on said inhibit core and said first and second storage cores and said first and second output coupling cores adapted to be energized simultaneously and to drive said inhibit core and said first and second storage cores and said first and second output coupling cores toward the datum residual state; shift winding means on said inhibit core and said second storage core adapted to be energized simultaneously and to drive said inhibit core toward the opposite residual state and to bias said second storage core toward the opposite residual state; and means for biasing said second storage core toward the datum residual state at all times.

3. A magnetic core branching circuit comprising a first and a second magnetic storage core; control windings on each of said cores; an input coupling core; a first and a second output coupling core; input and output winding means on each of said coupling cores; an inhibit core; output winding means on said inhibit core; circuit means connecting one winding of said output winding means on said input coupling core with the control winding means on said first storage core and the input winding means on said first output coupling core; further circuit means connecting a further winding of said output winding means on said input coupling core with the output winding means on said inhibit core and the control winding means on said second storage core and the input winding means on said second output coupling core; shift winding means on said input coupling core series connected with bias winding means on said inhibit core adapted to drive said input coupling core toward a datum residual state and bias said inhibit core toward an opposite state when energized from a first clock pulse source; shift winding means on said first storage core series connected with shift winding means on said second storage core adapted to drive said first storage core toward the datum residual state and to drive said second storage core toward the opposite residual state when energized from a second clock pulse source; shift winding means on said inhibit core series connected with shift winding means on each of said first and second storage cores and shift winding means on each of said first and second output coupling cores adapted to drive said inhibit core and said first and second storage cores and said first and second output coupling cores toward the datum residual state when energized from a third clock pulse source; shift winding means on said inhibit core series connected with bias winding means on said second storage core adapted to drive said inhibit core toward the opposite residual state and to bias said second storage core toward the opposite residual state when energized from a fourth clock pulse source; and means for biasing said second storage core toward the datum residual state at all times.

4. A magnetic core branching circuit comprising a first and a second magnetic storage core; control winding means on each of said cores; an input coupling core; a first and a second output coupling core; input and output winding means on each of said coupling cores; an inhibit core; output winding means on said inhibit core; circuit means connecting one winding of said output winding means on said input coupling core with the control winding means on said first storage and the input winding means on said first output coupling core; further circuit means connecting a further winding of said output winding means on the input coupling core with the output winding means on said inhibit core and the control winding means on said second storage core and the input winding means on said second output coupling core; shift winding means on said input coupling core series connected with bias winding means on said inhibit core adapted to drive said input coupling core toward a datum residual state and to bias said inhibit core toward an opposite residual state when energized by a first clock pulse source; shift winding means on said first storage core series connected with shift winding means on said second storage core adapted to drive said first storage core toward the datum residual state and to drive said second storage core toward the opposite residual state when energized by a second clock pulse source; shift winding means on said inhibit core series connected with shift winding means on each of said first and second storage core and shift winding means on each of said first and second output coupling cores adapted to drive said inhibit core and said first and second storage core and said first and second output coupling core toward the datum residual state when energized by a third clock pulse source; shift winding means on said inhibit core series connected with bias winding means on said second storage core adapted to drive said inhibit core toward the opposite residual state and to bias said second storage core toward the opposite residual state when energized by a fourth clock pulse source and means for biasing at least said first storage core toward the opposite residual state and said second storage core toward the datum residual state.

5. A magnetic core branching circuit comprising a first and a second magnetic storage core; control winding means on each of said cores; an input coupling core; a first and a second output coupling core; input and output winding means on each of said coupling cores; an inhibit core; output winding means on said inhibit core; circuit means connecting one winding of said output winding means on said input coupling core with the control winding means on said first storage and the input winding means on said first output coupling core; further circuit means connecting a further winding of said output winding means on said input coupling core with the output winding means on said inhibit core and the control winding means on said second storage core and the input winding means on said second output coupling core; shift winding means on said input coupling core series connected with bias winding means on said inhibit core adapted to drive said input coupling core toward a datum residual state and to bias said inhibit core toward an opposite residual state when energized from a first clock pulse source; shift winding means on said first storage core series connected with shift winding means on said second storage core adapted to drive said first storage toward the datum residual state and to drive said second storage core toward the opposite residual state when energized from a second clock pulse source; shift winding means on said inhibit core series connected with shift winding means on each of said first and second storage cores and shift winding means on each of said first and second output coupling cores adapted to drive said inhibit core and said first and second storage core and said first and second output coupling core toward the datum residual state when energized from a third clock pulse source; shift winding means on said inhibit core series connected with bias winding means on said second storage core adapted to drive said inhibit core toward the opposite residual state and to bias said second storage core toward the opposite residual state when energized from a fourth clock pulse source; means for biasing said second storage core toward the datum residual state at all times; and means for energizing said shift winding means including said first, second, third and fourth clock pulse source wherein said sources are actuated in sequence in the order named.

6. A magnetic core branching circuit comprising a first and second magnetic storage core; an input coupling core; a first and a second output coupling core; an inhibit core; each of said cores being formed of a magnetic material having a substantially rectangular hysteresis characteristic with a switching threshold; control winding means on each of said storage cores; input and output winding means on each of said coupling cores; output winding means on said inhibit core; circuit means connecting one winding of said output winding means on said input coupling core with the control windings on said first storage core and the input winding means on said first output coupling core; further circuit means connecting a further winding of said output winding means on said input coupling core with the output winding means on said inhibit core and the control winding means on said second storage core and the input winding means on said second output coupling core; shift winding means on said input coupling core series connected with a bias winding means on said inhibit core adapted to drive said input coupling core toward a datum residual state and to bias said inhibit core toward an opposite residual state when energized from a first clock pulse source; shift winding means on said first storage core series connected with shift winding means on said second storage core adapted to drive said first storage core toward the datum residual state and to drive said second storage core toward the opposite residual state when energized from a second clock pulse source; shift winding means on said inhibit core series connected with shift winding means on each of said first and second output coupling cores adapted to drive said inhibit core and said first and second storage core and said first and second output coupling core toward the datum residual state when energized from a third clock pulse source; shift winding means on said inhibit core series connected with bias winding means on said second storage core adapted to drive said inhibit core toward the opposite residual state and to bias said second storage core toward the opposite residual state when energized from a fourth clock pulse source; and means for biasing said second storage core toward the datum residual state and the remaining cores toward the opposite residual state.

7. A magnetic core branching circuit comprising a first and second magnetic storage core, an input coupling core; a first and second output coupling core; an inhibit core; each of said cores being formed of a magnetic material having a substantially rectangular hysteresis characteristic with a switching threshold, control winding means on each of said storage cores; input and output winding means on each of said coupling cores; output winding means on said inhibit core; circuit means connecting one winding of said output winding means on said input coupling core with the control winding means on said first storage core and the input winding means on said first output coupling core; further circuit means connecting a further winding of said output winding means on said input coupling core with the output winding means on said inhibit core and the control winding means on said second storage core and the input winding means on said second output coupling core; shift winding means on said input coupling core connected with bias winding means on said inhibit core adapted to drive said input coupling core toward a datum residual state and to bias said inhibit core toward an opposite residual state when energized from a first clock pulse source; shift winding means on said first storage core connected with shift winding means on said second storage core adapted to drive said first storage core toward the datum residual state and to drive said second storage core toward the opposite residual state when energized from a second clock pulse source; shift winding means on said inhibit core connected with shift winding means on each of said first and second storage cores and shift winding means on each of said first and second output coupling cores adapted to drive said inhibit core and said first and second storage core and said first and second output coupling core toward the datum residual state when energized from a third clock pulse source; shift winding means on said inhibit core connected with bias winding means on said storage core adapted to drive said inhibit core toward the opposite residual state and to bias said second storage core toward the opposite state when energized from a fourth clock pulse source; means for biasing said second storage core toward the datum residual state and the remaining cores toward the opposite residual state; and means for energizing said shift winding means including said first, second, third and fourth clock pulse source wherein said sources are actuated in sequence in the order named.

8. A magnetic branching circuit comprising a first and a second magnetic storage core; an inhibit core; an input coupling core; a first and second output coupling core; each of said cores being formed of a magnetic material having a substantially rectangular hysteresis characteristic with a switching threshold; control winding means on each of said storage cores; input and output winding means on each of said coupling cores; output winding means on said inhibit core; circuit means including a resistor series connecting one winding of said output winding means on said input coupling core with the control winding means on said first storage core and said input winding means on said output coupling core; further circuit means including a second resistor series connecting a further winding of said output winding means on said input coupling core with the output winding means on said inhibit core and the control winding means on said second storage core and the input winding means on said second output coupling core; shift winding means on said input coupling core series connected with bias winding means on said inhibit core adapted to drive said input coupling core toward a datum residual state and to bias said inhibit core toward an opposite residual state when energized from a first clock pulse source; shift winding means on said first storage core series connected with shift winding means on said second storage core adapted to drive said first storage core toward the datum residual state and to drive said second storage core toward the opposite residual state when energized from a second clock pulse source; shift winding means on said inhibit core series connected with shift winding means on each of said first and second storage cores and shift winding means on each of said first and second output coupling cores adapted to drive said inhibit core and said first and second storage core and said first and second output coupling core toward the datum residual state when energized from a third clock pulse source; shift winding means on said inhibit core series connected with bias winding means on said second storage core adapted to drive said inhibit core toward the opposite residual state and to bias said second storage core toward the opposite residual state when energized from a fourth clock pulse source; means for biasing said second storage core toward the datum residual state and the remaining cores toward the opposite residual state; and means for energizing said shift winding means including said first, second, third and fourth clock pulse source wherein said sources are actuated in sequence in the order named.

References Cited in the file of this patent

UNITED STATES PATENTS

| | | |
|---|---|---|
| 2,709,798 | Steagall | May 31, 1955 |
| 2,710,952 | Steagall | June 14, 1955 |
| 2,734,185 | Warren | Feb. 7, 1956 |
| 2,742,632 | Whitely | Apr. 17, 1956 |
| 2,779,934 | Minnick | Jan. 22, 1957 |
| 2,781,503 | Saunders | Feb. 12, 1957 |
| 2,805,409 | Mader | Sept. 3, 1957 |
| 2,894,151 | Russell | July 7, 1959 |

OTHER REFERENCES

"Logical and Control Functions Performed With Magnetic Cores," Proceedings of the I.R.E., March 1955, pp. 291–297, Guterman et al.